Aug. 15, 1967  R. L. PERL  3,335,867
SCREEN FILTER ASSEMBLY
Filed Oct. 5, 1965  2 Sheets-Sheet 1

INVENTOR
RICHARD L. PERL

BY *Oberlin, Maky & Donnelly*
ATTORNEYS

INVENTOR
RICHARD L. PERL

BY Oberlin, Maky & Donnelly
ATTORNEYS

United States Patent Office 3,335,867
Patented Aug. 15, 1967

3,335,867
SCREEN FILTER ASSEMBLY
Richard L. Perl, Mansfield, Ohio, assignor to The Tappan Company, Mansfield, Ohio, a corporation of Ohio
Filed Oct. 5, 1965, Ser. No. 493,016
8 Claims. (Cl. 210—167)

The present invention relates to a new and improved screen filter assembly for use with dishwashers and the like.

Present dishwashers both of the portable and built-in types commonly are formed with a central sump region directly below the water-distributing spray arm to which water and solids gravitate for filtering and recirculation during the washing operation by means of a pump mounted in the sump region. The spray arm is relatively elongated, and providing a filter screen having simultaneously the desired capacity and removability characteristics presents a distinct problem. One current approach satisfies the capacity requirement by providing a relatively large circular filter screen in the sump region, but to remove the same requires the removal of the spray arm, a decided inconvenience at best. A further approach has been to make the filter non-circular which permits simple removal thereof for cleaning and the like without requiring removal of the spray arm, but with a sacrifice of capacity.

An object of the present invention is to provide a filter screen assembly which is of relatively large capacity and which is mounted in the central sump region below the spray arm for convenient removal for cleaning and the like.

A more specific object of the invention is to provide such a screen filter assembly having two semicircular halves, each of which is independently mounted in the sump region below the spray arm for convenient removal without interference with the spray arm.

A further object of the present invention is to provide a screen filter assembly constructed and arranged to provide approximately double the filter area of present filter units of approximately the same peripheral dimension.

A further object of the present invention is to provide a filter screen assembly which is self-cleaning and which is designed to obviate leakage.

A further object of the present invention is to provide a screen filter assembly having two separate units or sections each of which is adapted to cooperate with guide means fixedly mounted in the sump region for accurately positioning the units in assembled relation.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
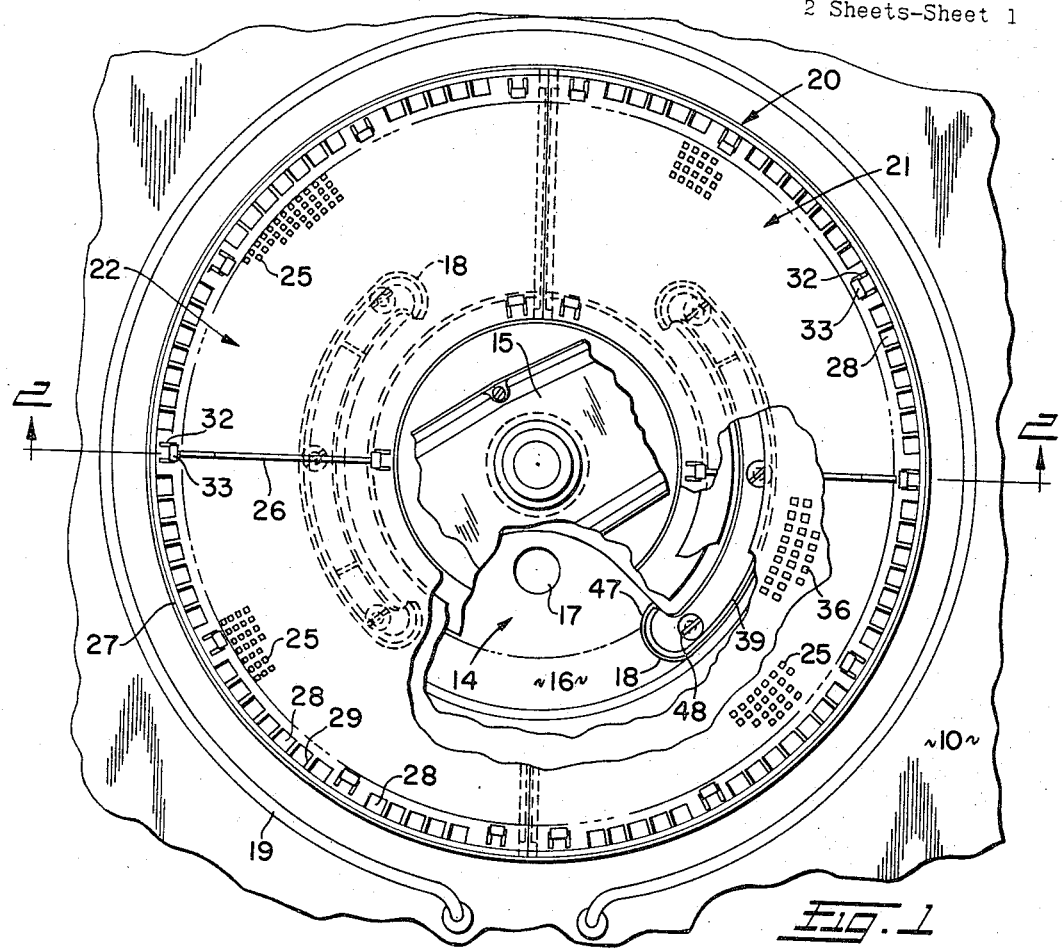
FIG. 1 is a fragmentary top plan view looking downwardly into the washing chamber of a dishwasher having mounted therein the novel screen filter unit of the present invention, with the upper and lower screen members being broken away in certain areas to expose structure therebelow.

Referring now in more detail to the drawings, wherein like reference characters have been used to indicate like parts, the centrally sloping bottom wall of the dishwasher is shown fragmentarily at 10, having a downwardly depressed annular wall section 11 defining a sump region 12 to which the washing liquid and solid food particles gravitate during the washing operation. A circular central opening 13 formed in the wall section 11 is adapted to receive a pump generally indicated at 14, with the recirculating outlet of the pump 14 communicating with a reaction-type spray arm 15 for driving the same in a manner well known in the art.

The pump 14, which per se forms no part of the present invention, includes drain sections 16 at diametrically opposed sides of the pump, only one such drain section being visible in FIG. 1, which are formed with drain openings 17 through which the washing liquid and solids pass for removal from the dishwasher during the drain cycle. the upper region of the pump 14 also includes diametrically opposed recirculating inlet sections 18 which are adapted to receive the washing liquid and finely divided filtered food particles for recirculation by the pump to the spray arm 15. It will be understood that suitable barriers or partitions are formed in the pump to separate the drain and recirculating inlet sections.

A generally circular heating element 19 is mounted relatively adjacent the sump region 12 and functions in the normal manner to additionally heat the hot tap water, as well as raising the temperature within the chamber to enhance the drying operation.

The screen filter assembly of the present invention comprises a pair of semi-circular filter units generally indicated at 21 and 22 which are mounted in the sump 12 around the upper part of pump 14. The screen filter units 21 and 22, which are completely separate units and independently mounted in the sump region, are identically constructed, each comprising an upper screen member 23 and a lower screen member 24 operatively connected thereto. The upper screen 23 is formed with a substantially continuous series of perforations 25 which effectively filter out the relatively coarse food particles and permit passage of the washing liquid and entrained fine solids to the chamber or space between the screens. The openings 25 can be suitably shaped and spaced and, by way of example but not limitation, the openings in the form shown are preferably square, being approximately .05 inch on each side, with the total open area provided by such perforations being preferably 40–50 percent of the total screen area. A vertical fin 26 is formed on each screen 23 approximately intermediate the ends thereof to facilitate handling of the respective filter units.

Figure 2:
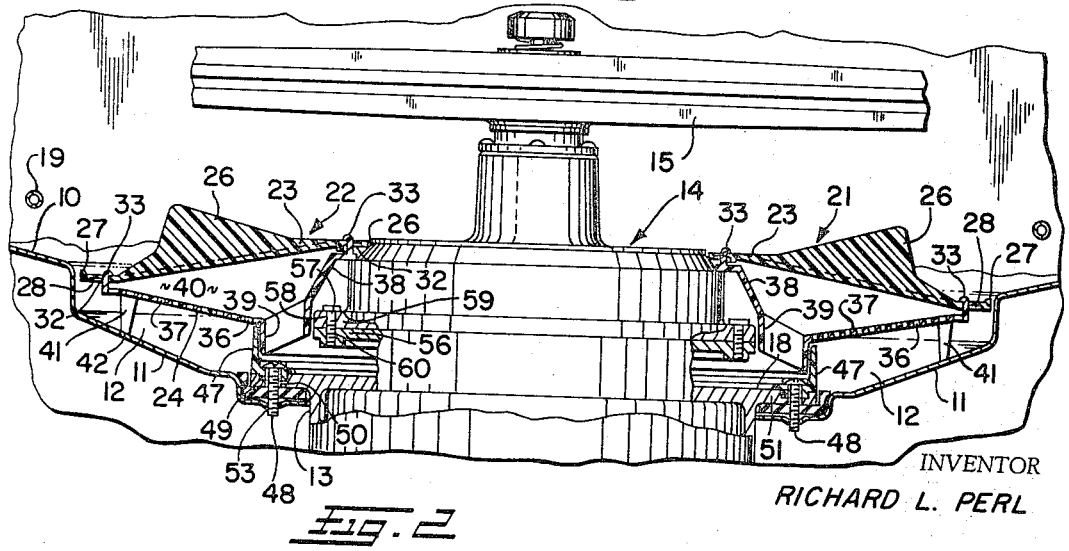
FIG. 2 is an enlarged cross-sectional view of the screen filter assembly of the invention, taken on line 2—2 of FIG. 1.

As seen in FIG. 2, each upper screen 23 slopes downwardly and outwardly from the radially inner end thereof, with the opposite, outer peripheral end terminating in a bead or flange 27. There is formed in the top screen 23 just inwardly from the outer bead 27 a substantially continuous series of relatively large openings 28, with such openings being spaced by ribs 29 which interconnect the bead 27 and the body of the upper screen. Water and solids flowing directly to the outer periphery of the filter unit and coarse food particles rejected by the upper screen 23, which consequently gravitate outwardly along the upper screen, pass through the relatively large openings 28 to the annular sump chamber below the lower screens 24.

Each upper screen 23 is formed relatively adjacent the inner and outer peripheral edges thereof with a series of arcuately spaced, generally U-shaped openings commonly designated at 32. Each of the openings 32 is adapted to receive vertically directed tabs commonly designated at 33 formed in each of the bottom screens 24 at the inner and outer peripheral edges thereof. The tabs 33 and openings 32 are preferably generally coextensive in width, and the tabs are formed with hook end portions 34, best seen in FIG. 4. The upper and lower screens 23 and 24, respectively, are preferably made of a plastic material, for example heat resistant polypropylene, which permits the necessary resilient compression of the upper hooked end 34 of each tab for entry through the associated opening 32. In this manner, the top and bottom screens 23 and 24, respectively, of each individual filter screen unit can be quickly and easily assembled without requiring the use of fasteners, bonding adhesive, or the like.

Each of the lower screens 24 is formed with a series of perforations 36 similar in size and arrangement to the perforations 25 in the upper screens 23. Such perforations are preferably formed only in the radially outer section 37 of the lower screen and not in the more steeply inclined central section 38 thereof.

Each lower screen 24 is formed with a downwardly extending drain outlet 39 which extends arcuately approximately 90°, as can be seen in FIG. 1, and to which the washing liquid and entrained fine solids entering the area 40 between the upper and lower screens 23 and 24 can pass. The drain outlets 39 are generally arcuately coextensive with the above-described recirculating inlet sections 18 in the upper portion of the pump 14, and the outlets 39 can be accurately aligned therewith in the manner to be presently described.

Figure 4:
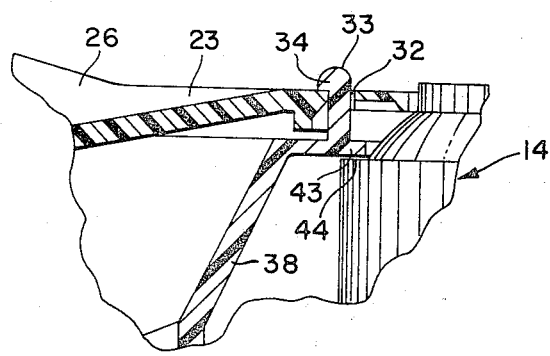
FIG. 4 is an enlarged fragmentary view more clearly showing the manner in which the upper and lower screens are interconnected and supported at their inner peripheries.

Each of the lower screens 24 is provided with a series of arcuately spaced downwardly depending supporting legs 41 which are in the form shown equal in number to the outer series of tabs 33 and formed radially inwardly thereof. Each supporting leg 41 is beveled at the bottom thereof as indicated at 42, with such bevel preferably being complemental to the slope of the bottom wall section 11 for stable positioning of the outer regions of the filter units. As best seen in FIG. 4, the inner periphery of each of the filter units is supported on the pump by means of a flange 43 at the inner periphery of the lower screen unit 24 which contacts and is supported by an annular shoulder 44 of the pump 14.

Figure 3:
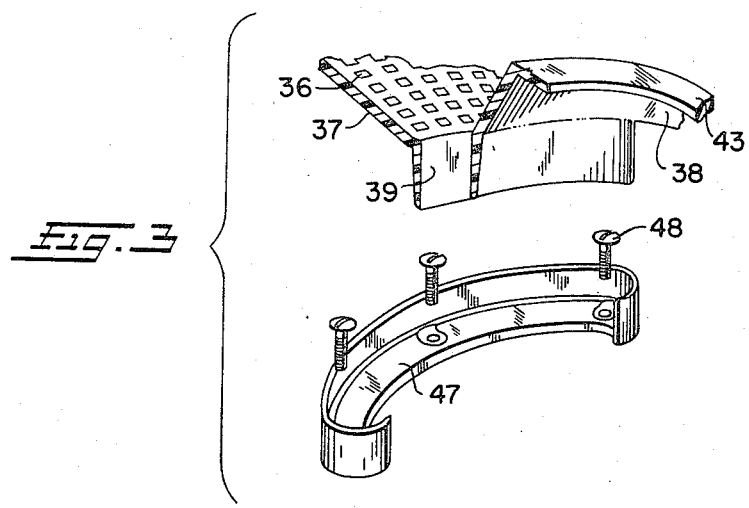
FIG. 3 is an exploded perspective, partially fragmentary view showing a section of the lower screen filter and the stationary guide member for accurately positioning the same.

Each recirculating inlet section 18 of the pump has associated therewith a guide member 47, best seen in the exploded FIG. 3 view, generally L-shaped in section and mounted on the pump by means of a plurality of self-tapping mounting screws 48. Referring to FIG. 2, the bottom of each guide member 47 is formed with embossed portions 49 which coincide in number and arragement with circular recesses 50 formed in pump wall 51 partially defining the inlet section 18. A gasket 52 is interposed between the wall 51 and the bottom wall 11 for sealing the pump mounting with the gasket, wall 51 and guide 47 being formed with aligned openings for receiving the several screws 48. The bottom wall 11 is formed with a series of screw-receiving openings 53 whereby the pump and guide 47 can be attached to the bottom wall 11.

The pump wall 56 which defines the top of the recirculating inlet section 18 is mounted in place by means of bolts 57 which extend downwardly through openings 58 formed in flange 59 of the pump into threaded engagement with corresponding openings 60 formed in the wall 56. As above noted, there are two pump recirculating inlets 18 provided, diametrically opposed, which direct the washer liquid and entrained fine solids to the pump for recirculation to the spray arm 15. Each guide member 47 is arcuately slightly longer than the discharge outlet 39 of each screen filter unit whereby the guide members serve not only to communicate the filtered washing liquid with the pump recirculating inlet section 18 but accurately to position the units when mounting the same.

The manner in which the screen filter assembly of the present invention filters the washing liquid and solid food particles should be apparent from the above description. To summarize, the washing liquid and finely divided food particles gravitating to the sump region 12 and contacting the upper screens 23 will pass through the perforations 25 in the upper screens to the interior 40 for ultimate passage through the discharge outlets 39 to the pump recirculating inlets 18. The coarse food particles rejected by the upper screens 23 will gravitate downwardly along the upper screen surfaces and will pass through the relatively large peripheral openings 28 to the sump region 12, together with the liquid and food solids passing directly to such area. During the washing operation, the washing liquid is recirculated rather than passed to drain and accordingly the level of the washing liquid and solid food particles builds up in the sump region. The washing liquid and entrained food particles in the sump region 12 are as a result forced upwardly against the bottom screens 24, with the liquid and finely divided solids passing upwardly through the perforations 36 in the screens for discharge through the outlets 39 to the recirculating inlets 18. Any coarse food particles will be rejected by the lower screen 24 and will gravitate to the bottom of the sump for ultimate discharge during a subsequent drain cycle of the washing operation. In this manner only washing liquid and relatively finely divided filtered solids are recirculated by the pump 14 through the spray arm 15 to the washing chamber for impinging action on the dishes and other ware positioned in the washing chamber. The liquid and solids of all sizes are discharged from the dishwasher during the drain cycle, with the recirculating inlets of the pump being closed at such time in conventional manner.

It will be noted that by virtue of the double-screen arrangement, the screen filter assembly is essentially self-cleaning. Any food particles tending to lodge in the perforations 25 of the upper screens 23 will tend to be dislodged by the washing liquid flowing upwardly through the bottom screens 24. Similarly, any food particles lodged in the bottoms of the perforations 36 of the lower screens 24 will tend to be dislodged by the washing liquid passing to the interior of the screen assembly through the perforations 25 in the upper screens 23.

It will also be seen that the problem of leakage prevalent with present filters of this general type has been virtually eliminated by the novel screen filter assembly of the present invention. The individual screen filter units are constructed and arranged to avoid the problem of relatively tight seating of the filters in the sump region. Each unit can be loosely positioned in the sump bottom by the guide means described, with peripheral leakage actually being part of the assembly design. That is, peripheral flow of washing liquid and food particles is a significant part of the design of the filter assembly of the present invention, with the bottom screen of the double-screen assembly serving to ensure that the coarse food particles passed at the periphery of the assembly are not recirculated by the pump to the spray arm.

It will be seen from the above that the objects of the present invention have been fully realized. By constructing the screen filter assembly as two separate units, each unit can be mounted or removed completely independently of the other and without having to disassemble or remove the spray arm 15, thereby providing the relatively large filter area desired without sacrifice of convenient removability of the filter for cleaning and the like. Further, through the novel double-screen arrangement, the total filtering area of the assembly is approximately doubled when compared with present filters of similar peripheral dimension. The unit can be manufactured at relatively low costs and can be quickly assembled through the tab arrangement described. The unit is vertically positioned in the sump region by the supporting legs 41 and is arcuately aligned by the guide members 47 and discharge outlets 39.

Other modes of applying the principle of the invention may be employed, change being made as regards the details described, provided the features stated in any of the following claims or the equivalent of such be employed.

I therefore particularly point out and distinctly claim as my invention:

1. A screen filter assembly for use in dishwashers and the like having a pump assembly mounted in the bottom wall thereof, comprising a pair of mating screen filter units adapted to be mounted in said bottom wall fully around said pump assembly, each of said units comprising an upper filter screen and a lower filter screen operatively connected thereto and spaced therefrom, means for vertically spacing each of said filter units from said bottom wall to provide an annular chamber between said wall and said lower screens, passage means formed in each of said filter units relatively adjacent the outer peripheries thereof for passing relatively coarse food particles rejected by said upper screens to said annular chamber, discharge means communicating with said space between said upper and lower screens for directing liquid and relatively finely divided solids passing through said upper and lower screens to said pump assembly for recirculation, and means selectively communicating said annular chamber below said lower screens with said pump for discharging the liquid and entrained solids from the dishwasher during a drain cycle.

2. A screen filter assembly for use in dishwashers and the like having a pump mounted in the sump region of the bottom wall thereof, comprising a pair of semicircular mating screen filter units adapted to be mounted in said sump region fully around said pump, each of said units comprising an upper filter screen and a lower filter screen operatively connected thereto and spaced therefrom to define a first chamber receiving liquid and finely divided food particles passing through said upper and lower screens, means for vertically spacing each of said filter units from said bottom wall to provide a second chamber between said wall and said lower screens, each of said upper screens being formed with a plurality of relatively large openings relatively adjacent the outer peripheries thereof for passing relatively coarse food particles rejected by said upper screens to said second chamber, first discharge means communicating with said first chamber for directing liquid and relatively finely divided solids passing thereto to the recirculating inlet sections of said pump for recirculation, and means communicating said second chamber with the drain inlet sections of said pump for discharging the liquid and solid food particles from the dishwasher during a drain cycle.

3. The screen filter assembly of claim 2 wherein said lower screen is formed with a series of upwardly extending tabs relatively adjacent the inner and outer peripheries thereof and said upper screen is formed with a series of complemental openings adapted to receive said tabs and thereby interconnect said upper and lower screens.

4. The screen filter assembly of claim 2 further including cooperable guide means on said pump and said lower screens for accurately positioning each of said filter units in said sump so as to communicate said first chamber with said recirculating inlet sections of said pump.

5. The screen filter assembly of claim 2 further including arcuate guide members mounted on said pump at the recirculating inlet sections thereof, said lower screens being formed with downwardly depending discharge outlets slightly less in arcuate extent than said guide means and adapted to be received therein thereby to accurately position said filter units in said sump to insure communication of said first chamber with said recirculation inlet section of said pump.

6. The combination of claim 2 further including means to vertically and arcuately position each of said filter units in said sump.

7. A screen filter assembly for use in dishwashers and the like having a pump provided with recirculating and drain inlet sections and mounted centrally in the sump region of the bottom wall thereof, comprising a pair of mating screen filter units adapted to be mounted in said sump portion of the dishwasher fully around said pump in the region of said inlet sections, each of said units comprising an upper filter screen and a lower filter screen spaced therefrom, said lower and upper screens being formed with cooperable tabs and tab openings for interconnecting said screens, supporting legs formed on said lower screens for vertically spacing each of said filter units from said bottom wall to provide an annular sump chamber between said wall and said lower screens, each of said upper screens being formed with a plurality of relatively large openings adjacent the outer peripheries thereof for passing relatively coarse food particles rejected by said upper screens to said annular sump chamber, discharge outlet means on each of said lower screens communicating with said space between said upper and lower screens for directing liquid and relatively finely divided solids passing through said upper and lower screens to the recirculating inlet sections of said pump for recirculation, and means communicating said annular sump chamber with the drain inlets of said pump for discharging the liquid and solid food particles from the dishwasher during a drain cycle.

8. The screen filter assembly of claim 7 further including guide means mounted at the recirculating inlet sections of said pump, said guide means receiving said discharge outlet means of said lower screens to insure communication between the space between said upper and lower screens and said recirculating inlet sections.

References Cited

UNITED STATES PATENTS

| | | | |
|---|---|---|---|
| 2,862,510 | 12/1958 | Geiger et al. | 134—111 |
| 3,084,701 | 4/1963 | Hardy et al. | 134—186 X |
| 3,197,981 | 8/1965 | Morey et al. | 210—314 X |

CHARLES A. WILLMUTH, *Primary Examiner.*

R. L. BLEUTGE, *Assistant Examiner.*